3,189,562
IMPROVEMENT OF THE ACTIVITY OF NICKEL HYDROGENATION CATALYSTS BY HIGH ENERGY IRRADIATION
Donald P. Graham, Brandywine Hundred, Del., assignor to E. I. du Pont de Nemours and Company, Wilmington, Del., a corporation of Delaware
No Drawing. Filed Jan. 12, 1961, Ser. No. 82,171
3 Claims. (Cl. 252—459)

This invention relates to a process for increasing the activity of a nickel hydrogenation catalyst.

More particularly this invention relates to the irradiation of nickel hydrogenation catalyst with high energy irradiation.

Numerous physical and chemical treatments have been investigated for the purpose of improving the activity of catalysts. It is well known that slight variation in the preparation of catalysts can markedly alter the activity of the catalysts and it is impossible to predict the effect of any particular treatment on a catalytic material. In recent years radiation of catalysts has been attempted to enhance activation and several catalysts have been exposed to gamma radiation. However the result of irradiation is unpredictable. For example, the hydrogenation catalyst zinc oxide, after subjection to gamma irradiation, showed a decreased activity for hydrogenation of ethylene. A discussion of prior research in this field has been given by E. H. Taylor in his article "Radiation Effects on Solids, Including Catalysts," in J. Chem. Educ. 36, 396 (1959).

It is an object of this invention to provide a process for increasing the activity of a nickel hydrogenation catalyst. Another object is to provide a process for increasing the activity of a nickel hydrogenation catalyst with high energy irradiation. A still further object is to provide increased activity of a nickel hydrogenation catalyst whereby the length of time required for the hydrogenation reaction will be reduced. Other objects will appear hereinafter.

These and other objects of this invention are accomplished by exposing the nickel catalyst to high energy radiation, particularly beta-rays and X-rays, and keeping the radiation dosage within suitable limits so as not to destroy the catalytic properties of the nickel catalyst. Any of the sources of high energy radiation which provide the designated energy levels can be used, such as the Van de Graaff accelerator, Crockcroft Walton accelerator or betatron to provide the beta rays and X-rays. The beta and X-rays affect the crystal structure of the nickel catalyst by producing additional active centers which are necessary for the catalytic hydrogenation reactions.

A preferred process is the treatment of a supported nickel hydrogenation catalyst with 1½ to 3 million electron volts of beta radiation in dosages of 5 to 60 watt seconds per square centimeter or with 1½ to 3 million electron volts of X-radiation in dosages of $1 \times 10^5$ to $1 \times 10^7$ REPS. (Roentgen equivalent physicals). The catalyst can be cooled during the irradiation, if desired, should overheating occur with continuous irradiation at the higher wattages or intermittent irradiation can be employed.

The activity of the nickel catalyst increased 14–31% after irradiation with beta-rays and as much as 26% after irradiation with X-rays as measured in the hydrogenation of nitrobenzene.

The nickel catalyst irradiated in the subject invention is of the type of nickel catalyst supported on diatomaceous earth or the Raney nickel catalyst both of which are commonly used in hydrogenation reactions. The nickel catalyst supported on diatomaceous earth may be conveniently prepared by following the method as described by L. W. Covert, R. Connor and H. Adkins in J.A.C.S. 54, 1651 (1932), wherein the basic carbonate of nickel is precipitated on the surface of kieselguhr by the addition of ammonium carbonate to a suspension of kieselguhr in a solution of nickel nitrate, filtered, washed, dried and reduced with hydrogen.

*Example 1*

A 2.0 g. sample of a nickel catalyst, prepared as described above, and containing 35% nickel was placed in a 2" x ½" round culture dish and was exposed for 1.1 second to 2 m.e.v. beta radiation at 10 watts per sq. cm. from a Van de Graaff generator. The irradiated catalyst showed a 31% increase in catalytic activity.

*Example 2*

Another 2.0 g. sample of a catalyst similar to that used in Example 1, after an exposure of 5.5 seconds to 2 m.e.v. beta radiation at 10 watts per sq. cm., showed an increase of 14% in catalytic activity.

*Example 3*

A catalyst sample similar to that employed in Example 1 was subjected to X-radiation at 2 m.e.v., produced by allowing the electron beam from a Van de Graaff generator to impinge on a 2 mm. gold target. A dosage of $5 \times 10^5$ REPS. produced a gain in catalytic activity of 26%.

The activity of the catalyst in each of the above examples was determined by the following procedure.

A 400 cc. stainless steel lined shaker bomb was charged with 40 cc. thiophene-free nitrobenzene, 112 cc. isopropyl alcohol, 47 cc. distilled water and 0.218 g. of catalyst. The bomb was pressure tested with nitrogen to 500–600 p.s.i. The nitrogen was released and replaced with 500–600 p.s.i. hydrogen, released repressurized and released to 100 p.s.i. hydrogen. The bomb was heated to 100° C., the pressure raised to 300 p.s.i. hydrogen and shaker started. Readings were taken every minute and time noted when the pressure reached 200 p.s.i. The pressure was immediately increased to 300 p.s.i. and the procedure repeated until the hydrogenation was discontinued or completed. The first pressure drop and last few drops were disregarded to eliminate effects of the initial induction period and the nitrobenzene concentration fall-off at the end. Only those drops were used which showed a constant time for the 100 p.s.i. drop.

The increase in activation was determined by comparing the time for pressure drops using equal weights of standard catalyst and an irradiated catalyst.

The necessity of suitable irradiation limits is illustrated by the following table which shows the loss in catalytic activity due to excess irradiation.

*Effects of excess irradiation of a nickel catalyst*

[2 M.E.V. BETA-RAYS AT 10 WATTS/CM.²]

| Exposure in seconds | Percent activity change |
|---|---|
| 11 | −14 |
| 110 | −25 |
| 730 | −100 |
| 1100 | −100 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for increasing the activity of a nickel hydrogenation catalyst selected from the group consisting of Raney nickel and nickel supported on diatomaceous earth which comprises irradiating said catalyst with high energy irradiation selected from the class consisting of 1½ to 3 million electron volts of beta radiation in a dosage of 5 to 60 watt seconds per square centimeter and 1½ to 3 million electron volts of X-radiation in dosages of $1 \times 10^5$ to $1 \times 10^7$ REPS.

2. A process for increasing the activity of a nickel hydrogenation catalyst selected from the group consisting of Raney nickel and nickel supported on diatomaceous earth which comprises irradiating said catalyst with 1½ to 3 million electron volts of beta radiation in a dosage of 5 to 60 watt-seconds per square centimeter.

3. A process for increasing the activity of a nickel hydrogenation catalyst selected from the group consisting of Raney nickel and nickel supported on diatomaceous earth which comprises irradiating said catalyst with 1½ to 3 million electron volts of X-radiation in dosages of $1 \times 10^5$ to $1 \times 10^7$ REPS.

References Cited by the Examiner
UNITED STATES PATENTS

| | | | |
|---|---|---|---|
| 1,280,314 | 10/18 | Schwarcman | 252—459 |
| 2,267,735 | 12/41 | Ipatieff et al. | 252—466 X |
| 2,905,608 | 9/59 | Noddings et al. | 252—411 X |
| 2,983,690 | 5/61 | Bertolacini | 252—463 X |
| 3,002,910 | 10/61 | Caffrey | 252—472 X |
| 3,074,880 | 1/63 | Domash et al. | 252—466 X |

MAURICE A. BRINDISI, *Primary Examiner.*

JULIUS GREENWALD, *Examiner.*